United States Patent
Petzold et al.

(10) Patent No.: US 6,588,270 B1
(45) Date of Patent: Jul. 8, 2003

(54) FILLING LEVEL INDICATOR FOR A WASHER FLUID CONTAINER

(75) Inventors: Sven Petzold, Wiesbaden (DE); Ralph Uenver, Netzbach (DE); Rainer Kober, Darmstadt (DE)

(73) Assignee: Mannesmann VDO AG, Frankfurt (DE)

( * ) Notice: Subject to any disclaimer, the term of this patent is extended or adjusted under 35 U.S.C. 154(b) by 20 days.

(21) Appl. No.: 09/726,718

(22) Filed: Nov. 14, 2000

(30) Foreign Application Priority Data

Nov. 17, 1999 (DE) .......................... 199 55 077

(51) Int. Cl.7 .................... G01F 23/00; G01F 23/52; G08B 21/00
(52) U.S. Cl. .................... 73/293; 73/313; 340/617
(58) Field of Search ............... 73/293, 304 R, 73/307, 313; 340/617; 250/577, 900, 357.1; 116/109, 227

(56) References Cited

U.S. PATENT DOCUMENTS

| | | | | |
|---|---|---|---|---|
| 3,246,313 A | * | 4/1966 | Weaklend | 200/61.2 |
| 3,568,628 A | * | 3/1971 | Llyod | 116/118 |
| 3,808,887 A | * | 5/1974 | Buttriss | 73/293 |
| 4,322,713 A | * | 3/1982 | Duck et al. | 340/59 |
| 4,468,567 A | * | 8/1984 | Sasano et al. | 250/577 |
| 4,506,258 A | * | 3/1985 | Charboneau et al. | 340/618 |
| 4,563,313 A | * | 1/1986 | Tsuaki | 261/81 |
| 4,570,483 A | * | 2/1986 | Sobue | 73/290 V |
| 4,574,328 A | * | 3/1986 | Maier | 361/284 |
| 4,903,530 A | * | 2/1990 | Hull | 73/304 R |
| 5,088,324 A | * | 2/1992 | Nemeth | 73/291 |
| 5,291,031 A | * | 3/1994 | MacDonald et al. | 250/577 |
| 5,804,831 A | * | 9/1998 | Romatzick | 250/577 |
| 5,889,284 A | * | 3/1999 | Mattis | 250/577 |

* cited by examiner

Primary Examiner—Hezron Williams
Assistant Examiner—Katina Wilson
(74) Attorney, Agent, or Firm—Martin A. Farber

(57) ABSTRACT

Filling level indicators for washer fluid containers in motor vehicles have hitherto been arranged directly on the washer fluid container or been integrated in the instrument cluster on the motor vehicle. Despite the available information, the filling of the container when the level is too low is often delayed. A filling level indicator more effectively indicates the filling level by arranging the filling level indicator in the region of the tank filler neck, whereby the filling level in the washer fluid container is only indicated to the driver when he has in any case interrupted his journey in order to fill up with fuel and is free from other activities, so that it is virtually impossible for him to be distracted.

11 Claims, 3 Drawing Sheets

FILLING LEVEL INDICATOR FOR A WASHER FLUID CONTAINER

FIELD AND BACKGROUND OF THE INVENTION

The subject matter of the invention is a filling level indicator for a washer fluid container as preferably used in motor vehicles.

It is known to equip washer fluid containers which are arranged in motor vehicles so that they indicate to the driver the current filling level in the washer fluid container. Filling level indicators of this type are known both as indicators of the entire filling level and as indicators of the remaining quantity.

Essentially, two types of indicating device are known. In addition to mechanical indicating devices, which are generally float-operated enabling the level to be read off directly on the washer fluid container, a multiplicity of electric indicating devices are known in which the filling level is detected by means of one or more sensors and an electric signal obtained therefrom is used in order to indicate the filling level. Generally, the last-mentioned filling level indicator is integrated in the instrument cluster on the motor vehicle and, when the ignition is switched on, continuously informs the driver about the current filling level and when it has fallen below a certain remaining quantity in the washer fluid container.

Whereas, for example, not paying attention to the indicator indicating that the cooling-water temperature is too high directly results in the motor vehicle being damaged, this risk is not involved in the case of the filling level indicator for the washer fluid. Consequently, despite the continuous indication of the level being too low, the filling of the washer fluid is often delayed until the washer fluid container is empty. With the washer fluid container empty and, for example, adverse weather conditions resulting in restricted vision, traffic-endangering situations may occur.

SUMMARY OF THE INVENTION

The invention is therefore based on the object of providing a filling level indicator for a washer fluid container, said indicator enabling the filling level to be indicated more effectively.

The filling level indicator according to the invention has the advantage that, with it being positioned in the region of the tank filler neck, the driver is informed about the filling level in the washer fluid container precisely whenever he has in any case to interrupt his journey in order to fill up the fuel tank. Firstly, at least at the beginning of filling up with fuel, the driver's attention is directed to this region and therefore inevitably to the indicating element, and, secondly, the driver is situated at this time at a location, for example a gas station, at which both washer fluid and also necessary additives, such as antifreeze and cleaning agents, are available without a relatively large outlay. A further advantage is that the driver obtains information concerning the topping-up of the washer fluid container at a time when he is generally free from other activities, so that he can fill up the washer fluid container at the same time as filling up with fuel. The filling up of the washer fluid container thereby takes up relatively little time. At the same time, the device according to the invention avoids a situation in which the driver pays less attention to or ignores the information content, as is the case, for example, with indicators arranged permanently in the driver's field of view.

Furthermore, the filling level indicator has the advantage of being independent of the surrounding light, and therefore the indicating element can readily be seen even in reduced light.

In the most simple case, the filling level indicator is an indicating element consisting of a transparent material which is lit from behind by at least one light source. The light source may, for example, be a bulb or a light-emitting diode—called LED in the following text. The filling level indicator according to the invention is therefore of particularly simple construction. In order to avoid damage to the indicating element and therefore also to the light source by the fuel nozzle, the indicating element has an adequate wall thickness. Fuel vapors are therefore effectively prevented from coming into contact with electrically conductive parts. The filling level indicator can be arranged both next to the tank filler neck in the filler neck compartment and also on the tank flap.

Even greater security against damage is ensured by a refinement in which the light source is separated spatially from the indicating element, the filling level indicator additionally comprising a light guide which is arranged between the light source and the indicating element. The light source can thereby be arranged in a safe region. The necessary security is therefore provided not only when filling up with fuel, but also in the event of an accident in the rear region of the motor vehicle.

In vehicles having a central-locking system, the tank flap can be locked by means of this system. The locking is undertaken here by an actuator. consisting of a gear motor having a tappet. This actuator is arranged next to the filler neck compartment, but behind the vehicle body. In this case, an advantageous refinement resides in integrating the light source in the housing of the actuator. On the one hand, the light source can therefore be protected mechanically and from contamination without an additional housing. On the other hand, there are already electrical connections for the gear motor in the actuator, with the result that connections for the light source can be arranged without a relatively large outlay. Furthermore, the light source does not need to be fastened separately and can be preassembled together with the actuator.

Moreover, it is advantageous to arrange the indicating element on the tappet of the actuator for the tank-flap lock. Since the tappet already has a passage through the vehicle body, this arrangement for the indicating element means that no further opening together with the associated seal is needed in the vehicle body. The retrofitting of the filling level indicator according to the invention or the change to this filling level indicator does not result in any changes to the vehicle body. At the same time, an additional installation of the filling level indicator in the region of the filler neck is rendered superfluous.

To more clearly indicate the filling level, it is advantageous if the tappet is extended, when the tank flap is opened, from its recessed position into the visible region within the filler neck compartment. The tappet can be extended in a simple manner, independently of the central-locking system, by a switch, for example a reed contact, being actuated with tho opening of the tank flap. It is furthermore possible to couple the retraction and extension of the tappet to a tank cap-recognizing means in accordance with DE 44 04 014 A1, so that the tappet is extended when the tank cap is removed and retracted when the tank cap is closed. The retraction of the tappet can be triggered after a fixedly predetermined period in a particularly simple manner by means of a relay.

In another refinement, the tappet is only extended, or the filling level indicator only activated, if an appropriate signal, for example washer fluid container half full, washer fluid container empty, is supplied by the filling level sensor in the washer fluid container.

In order to even more clearly indicate the filling level, it is advantageous to arrange two or more light sources having different colors which light one or more indicating elements from behind. This enables different filling levels to be rendered visible by means of different colors. In this case, a green light source could signal an adequate filling level, a yellow light source informs the driver that the filling level amounts to less than half, and a red light source indicates to the driver that the filling level is approaching zero or that the washer fluid container is empty.

The same effect can also be achieved with one light source instead of with a plurality of light sources if the light source is lit continuously during indicating when the filling level is still adequate, and, when a reserve filling amount is reached, begins to flash, or vice versa. In this case, operating exclusively with a filling-level-dependent flashing frequency is also conceivable. However, indicating combinations comprising a plurality of light sources are also possible, said combinations being operated with a filling-level-dependent flashing frequency.

So that the filling level indicator according to the invention does not unnecessarily load the vehicle electric system or the battery, the filling level indicator is only activated if the driver intervenes in the region of the filler neck compartment or of the filler neck. For this purpose, a switch is arranged for activating the filling level indicator. Activation of the filling level indicator has the result that the filling level is determined by means of the filling level sensor in the washer fluid container, and an appropriate signal is directed to the filling level indicator. This switch can advantageously be realized by means of a reed contact by a magnet being arranged on the tank flap and the reed contact being arranged on the tappet of the tank-flap lock, on the vehicle body in the filler neck compartment or on the filler neck. In the last case, the magnet is arranged on the tank cap.

In many motor vehicles, an actuating element for unlocking the tank flap is arranged in the passenger compartment. In a particularly simple design, this actuating element is used at the same time, in order to activate the filling level indicator.

In another refinement, the filling level indicator for the washer fluid container is activated during filling with fuel. When a tank cap-recognizing means is present, the filling level indicator is activated when the tank cap is removed from the filler neck. Furthermore, however, the signals from the filling level sensor in the fuel tank may also be used by the filling level indicator for the washer fluid container being activated when there is a rise in the fuel level. In addition, the activation may be associated with further signals, for example ignition "off", wheel speed "zero".

The deactivation of the filling level indicator for the washer fluid container can be triggered by individual signals or by combinations of a plurality of signals, for example tank flap "closed", tank cap "fitted", fuel level "constant", ignition "on", wheel speed "greater than zero", central-locking system "locked". In another advantageous refinement, the deactivation of the filling level indicator takes place after a predetermined period.

BRIEF DESCRIPTION OF THE DRAWINGS

The invention is explained in greater detail with reference to a plurality of exemplary embodiments. In the drawings

DETAILED DESCRIPTION OF THE PREFERRED EMBODIMENTS

Figure 1:
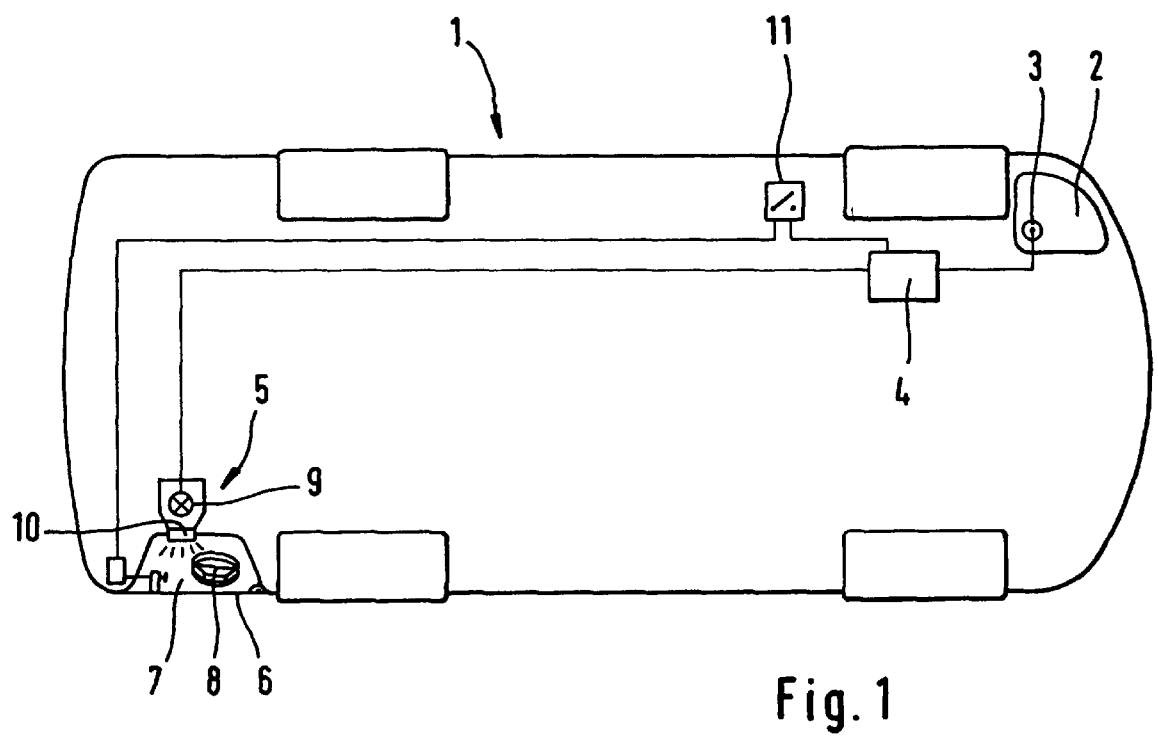
FIG. 1 shows a schematic illustration of the filling level indicator in a motor vehicle.

FIG. 1 illustrates a motor vehicle 1 schematically. A washer fluid container 2 having a filling level sensor 3 is arranged in the front region. The signals supplied by the filling level sensor 3 are evaluated in a control unit 4 and converted into an appropriate signal passed to a filling level indicator 5. The filling level indicator 5 is arranged in the region of a tank filler neck 8 in the filler neck compartment 7, which is covered by a tank flap 6. The filling level indicator 5 consists of a bulb 9 and an indicating element 10 for the filling level. The indicating element 10 consists of a transparent material which contains a symbol for the filling level. An actuating element 11 which is arranged in the passenger compartment and is intended for unlocking the tank flap 6 is connected to the control unit 4 in such a manner that, when the flap is unlocked, the filling level sensor 3 in the washer fluid container 2 is evaluated. If the filling level corresponds to a value which is provided for indicating purposes, for example container half empty, the filling level indicator 5 is illuminated. After a time span of 3 minutes the filling level indicator 5 is extinguished.

Figure 2:
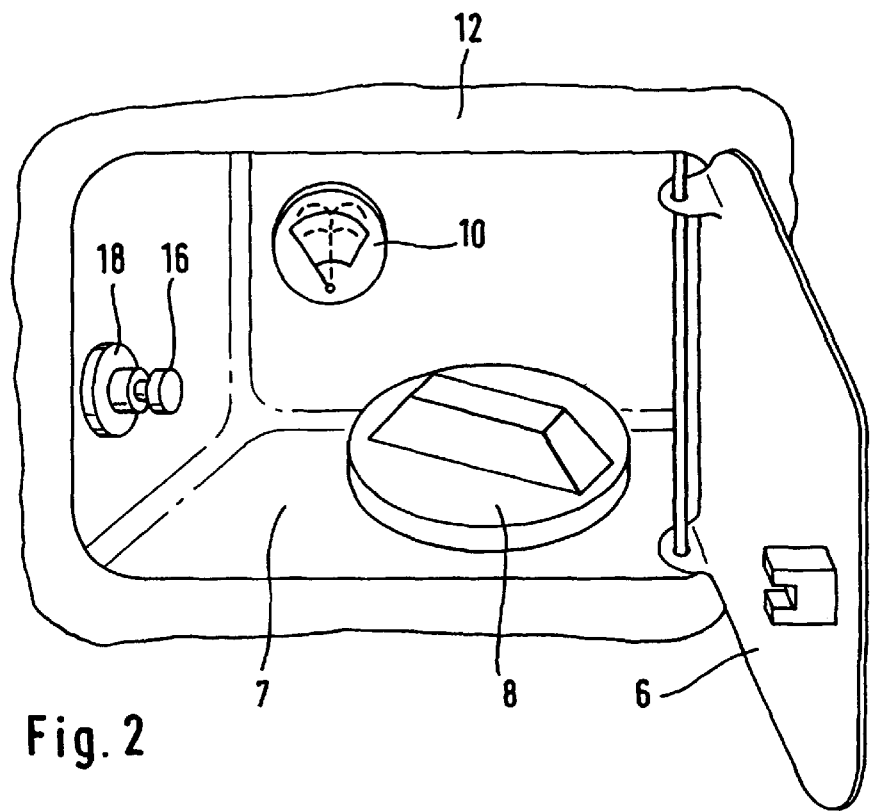
FIG. 2 shows the region of the filler neck compartment with an opened tank flap and the indicating element.

FIG. 2 shows one possible arrangement of the indicating element 10 with respect to the tank filler neck 8 in the filler neck compartment 7.

Figure 3:
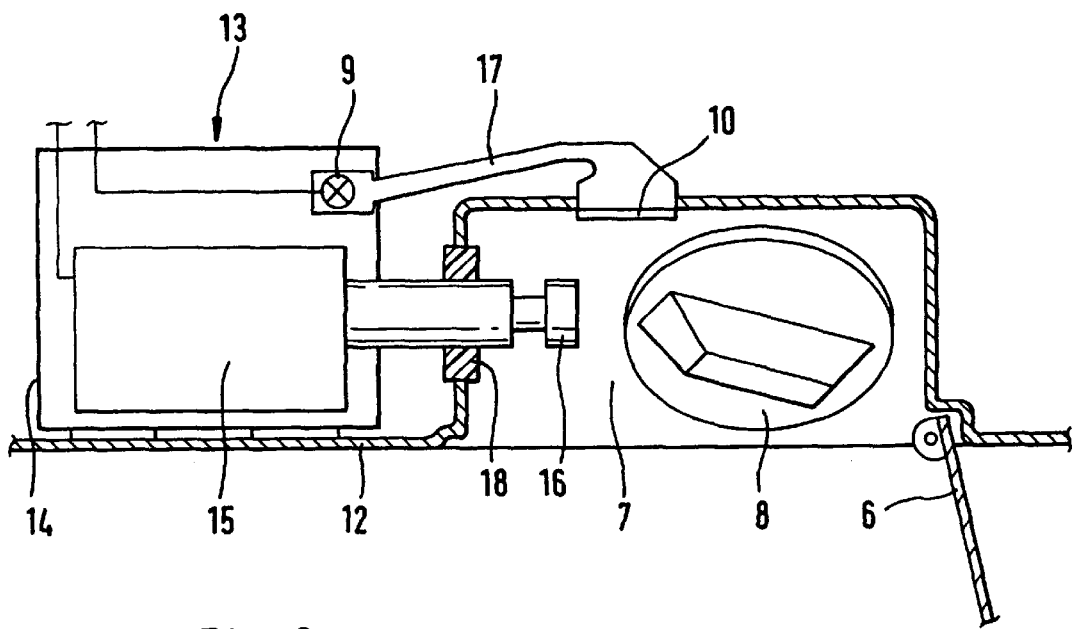
FIG. 3 shows the filler neck compartment in section together with the filling level indicator.

The filler neck compartment 7 is illustrated with opened tank flap 6 in FIG. 3. An actuator 13, forming part of a central-locking system, is situated behind the vehicle body panel 12 next to the filler neck compartment 7. The actuator 13 consists of a housing 14 in which a gear motor 15 having an extendable tappet 16 is connected. The housing 14 furthermore contains a bulb 9 whose light is directed to the indicating element 10 via a flexible light guide 17.

Figure 4:
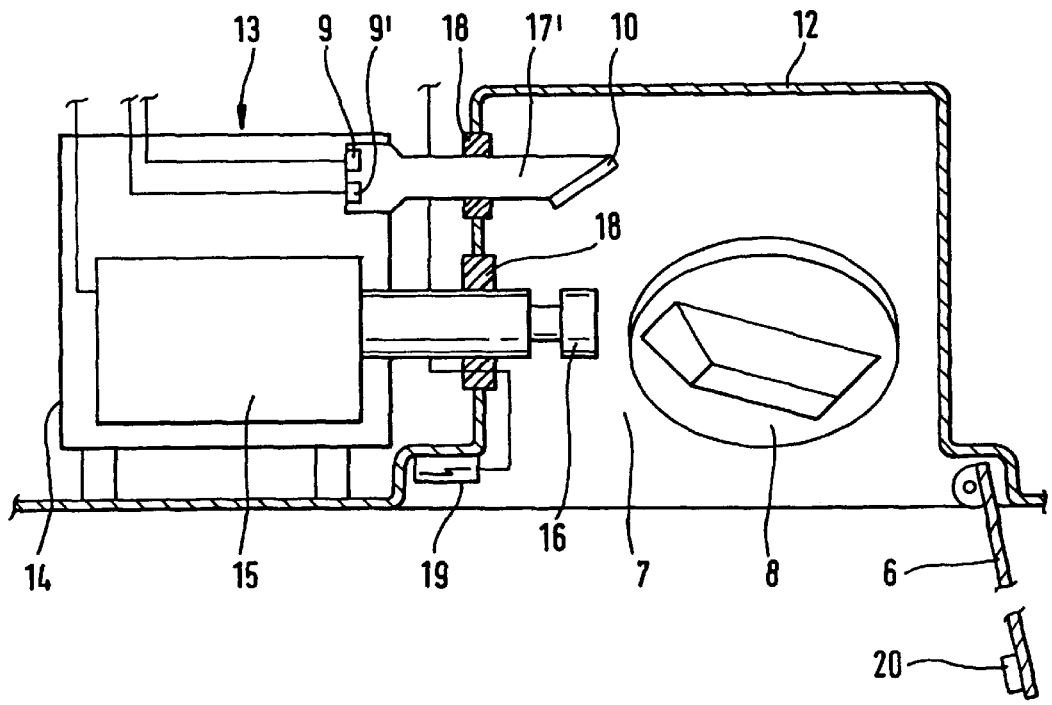
FIG. 4 shows a further embodiment of the filling level indicator.

FIG. 4 shows a further refinement of the filling level indicator 5 according to the invention. In contrast to FIG. 3, a yellow and a red LED 9, 9' are arranged in the housing 14, said LEDs signaling different filling levels by means of different coloring. While the yellow LED 9 is activated at a filling level of "half full" to "minimum quantity", the red LED 9' is activated when the level falls below the "minimum quantity" in the washer fluid container 2. The light is transmitted by means of a rigid light guide 17' whose end facing away from the light source is beveled and bears the indicating element 10. Both the tappet 16 and the light guide 17' are sealed off with respect to the vehicle body 12 by a respective seal 18. In order to activate the filling level indicator 5, a reed contact 19 is used as a switch, said contact interacting with a magnet 20 fastened on the tank flap 6.

Figure 5:
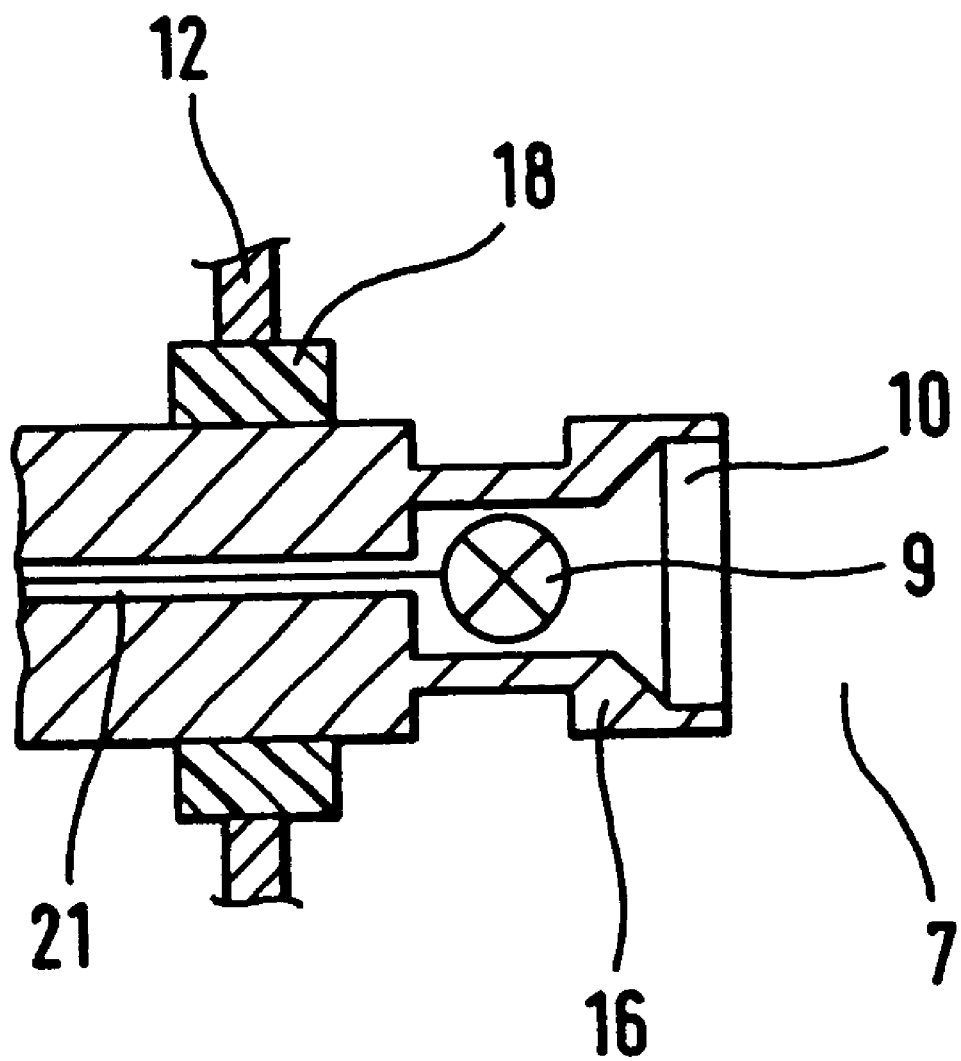
FIG. 5 shows the tappet of the tank-flap lock.

FIG. 5 shows an enlarged illustration of the tappet 16 of the tank-flap lock. The tappet 16 has a hole 21 to whose end facing the tank filler neck 8 the indicating element 10 is fastened. The light source 9 is arranged directly behind it. In this case, it is also conceivable to arrange the light source at the other end of the tappet or to arrange the light source in the housing and to couple the light into the hole in the tappet by means of a light guide.

We claim:

1. A filling level indicator for a washer fluid container in a motor vehicle, said indicator being located at a tank filler neck of a fuel container of the motor vehicle to be visible to a person directing fuel to the filler neck of the fuel container, said indicator having an indicating element and at least one light source, the indicating element being connected via a control unit to a filling level sensor disposed in the washer fluid container, wherein the filling level indicator is distant from the washer fluid container, and the at least one light source illuminates the indicating element at a time when the filler neck is to receive fuel.

2. The filling level indicator as claimed in claim 1, wherein the filling level indicator (5) comprises at least one light guide (17, 17') which is arranged between said light source (9, 9') and the indicating element (10).

3. The filling level indicator as claimed in claim 1, wherein the light source (9, 9') is an LED or a bulb.

4. The filling level indicator as claimed in claim 1, wherein the light source (9, 9') is a light source which emits at least two different colors.

5. The filling level indicator as claimed in claim 1, wherein the indicating element (10) is made of a transparent material.

6. The filling level indicator as claimed in claim 1, wherein the filling level indicator (5) is connected to a switch (11, 19, 20).

7. The filling level indicator as claimed in claim 6, wherein the switch is a reed contact (19) or an actuating element (11) in a passenger compartment of the vehicle (1).

8. A filling level indicator for a washer fluid container in a motor vehicle, said indicator being connected via a control unit to a filling level sensor arranged at a tank filler neck of a fuel container of the motor vehicle, and comprises at least one light source (9, 9') and at least one indicating element (10), wherein the light source (9, 9') is arranged in or on an actuator (13) for a tank-flap lock and the light source in connection with the actuator for the tank-flap lock builds a structural unit.

9. A filling level indicator for a washer fluid container in a motor vehicle, said indicator being connected via a control unit to a filling level sensor arranged at a tank filler neck of a fuel container of the motor vehicle and comprises at least one light source (9, 9') and at least one indicating element (10), wherein the light source (9, 9') is arranged in a tappet (16) of an actuator (13).

10. The filling level indicator as claimed in claim 9, wherein the indicating element (10) is arranged in or on the tappet (16).

11. A filling level indicator for a washer fluid container in a motor vehicle, said indicator being connected via a control unit to a filling level sensor arranged at a tank filler neck of a fuel container of the motor vehicle and comprises at least one light source (9, 9') and at least one indicating element (10), wherein the indicating element (10) is fastened next to the tank filler neck (8) on vehicle body (12) or a tank flap (6).

* * * * *